Figure 1:
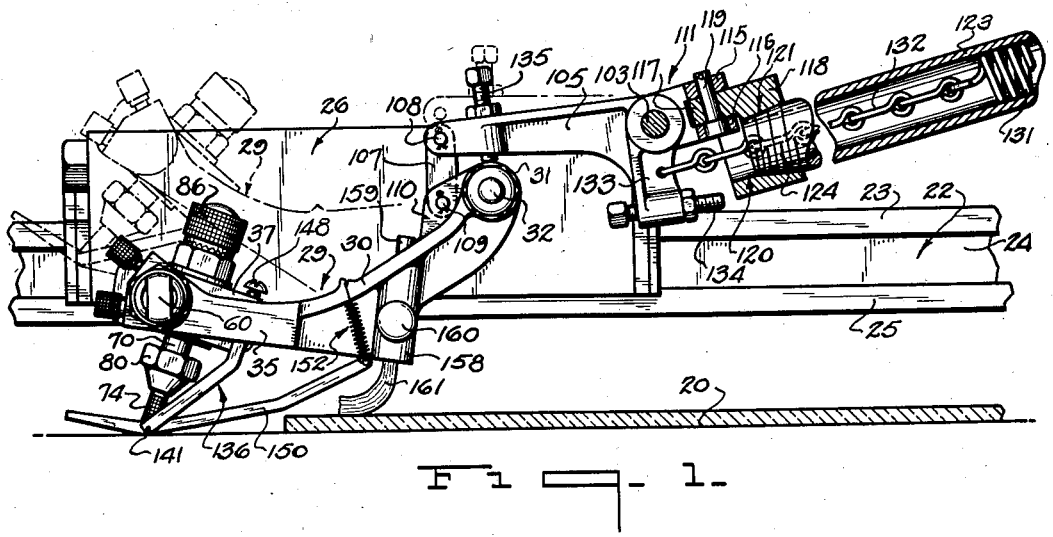

June 2, 1936.  E. A. ROSIN  2,042,553

CUTTING APPARATUS

Filed June 18, 1934  4 Sheets—Sheet 1

Inventor
EDWIN A. ROSIN.
By Frank Fraser
Attorney

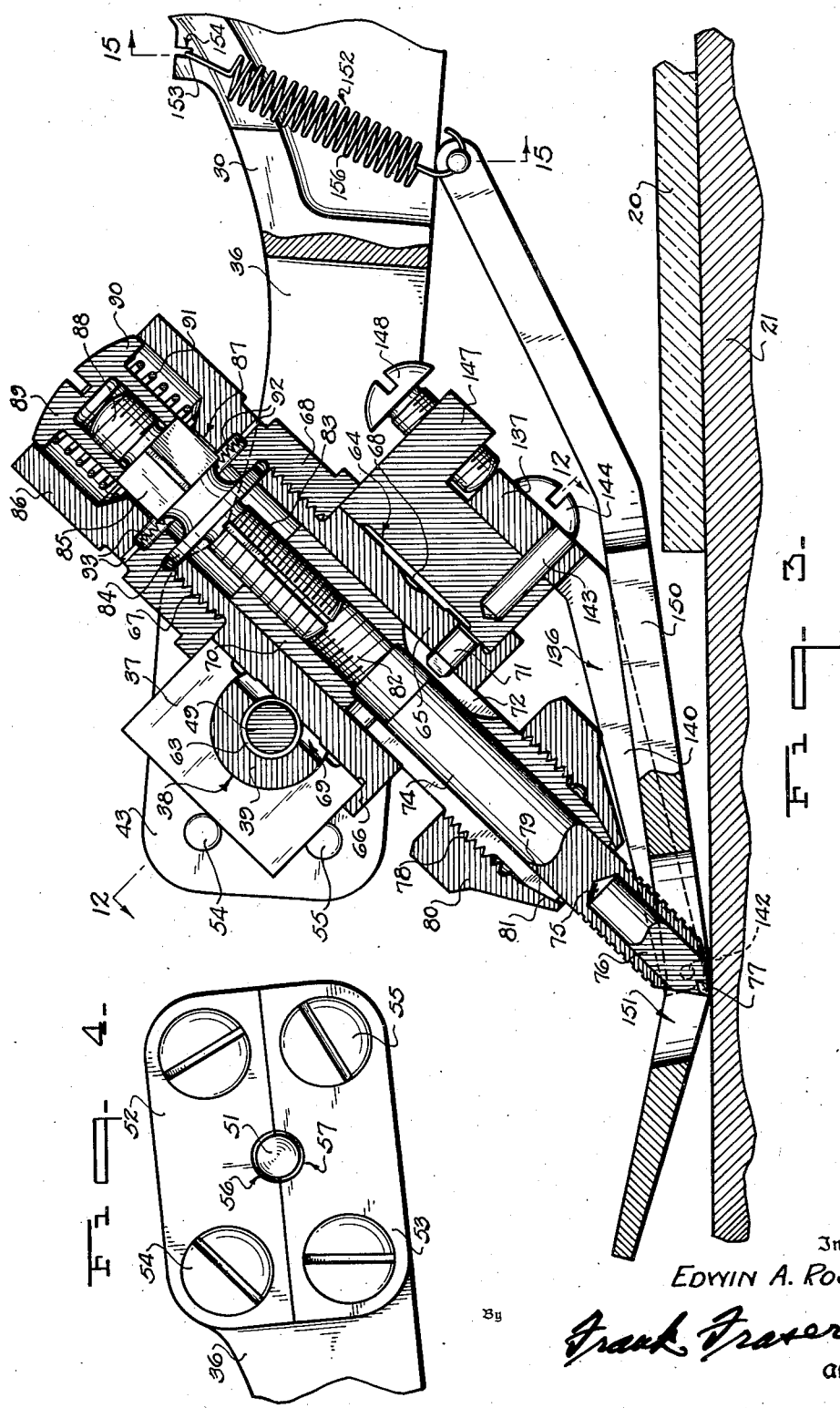

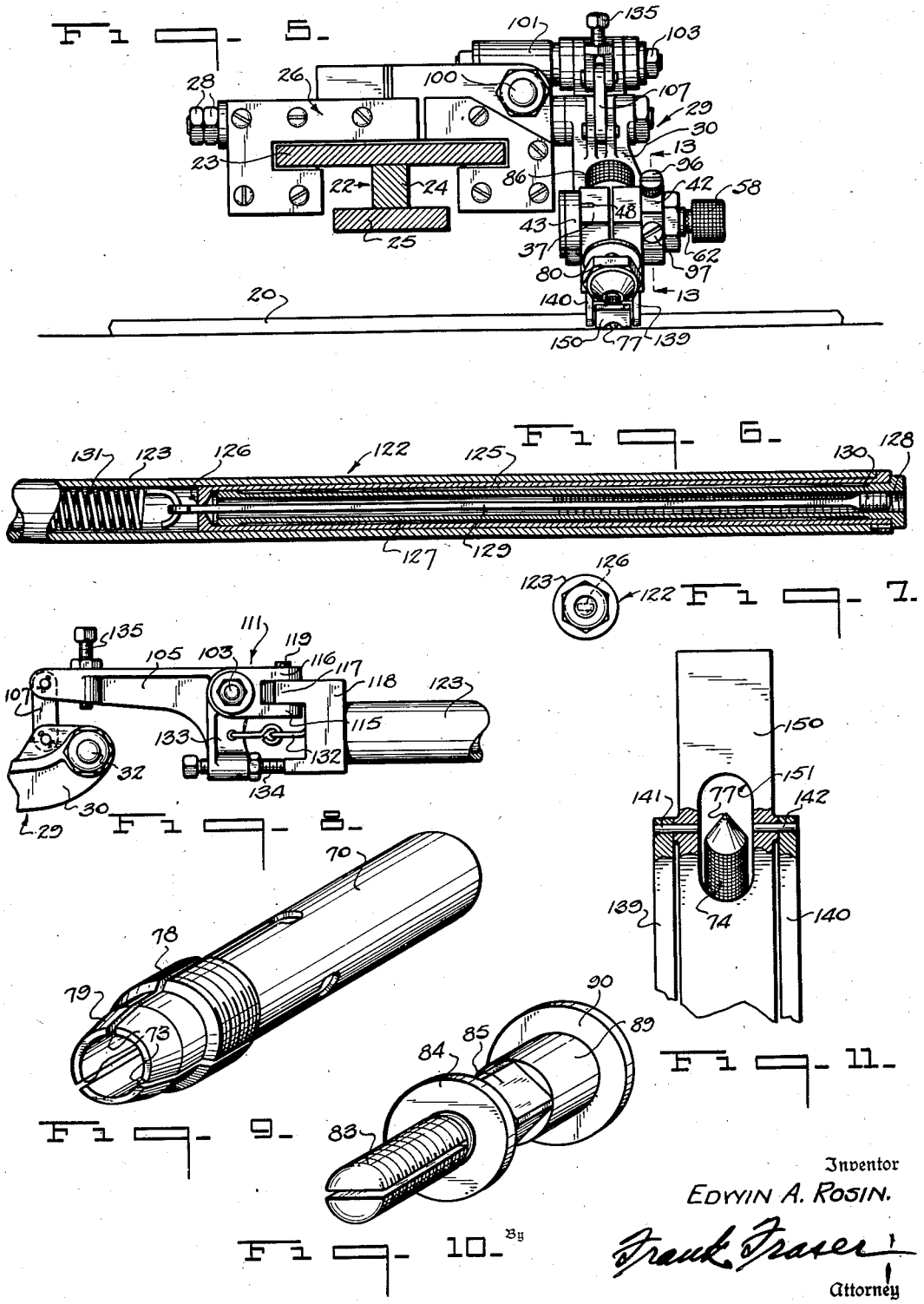

June 2, 1936.  E. A. ROSIN  2,042,553
CUTTING APPARATUS
Filed June 18, 1934  4 Sheets-Sheet 4
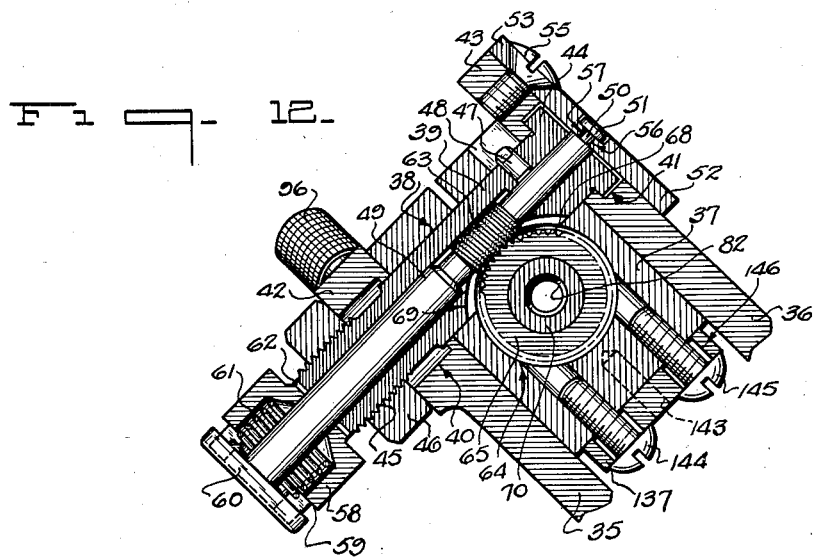
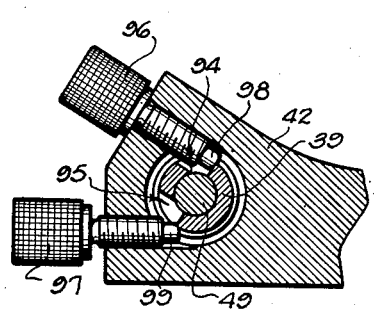
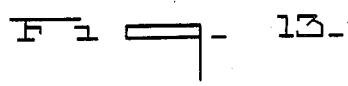
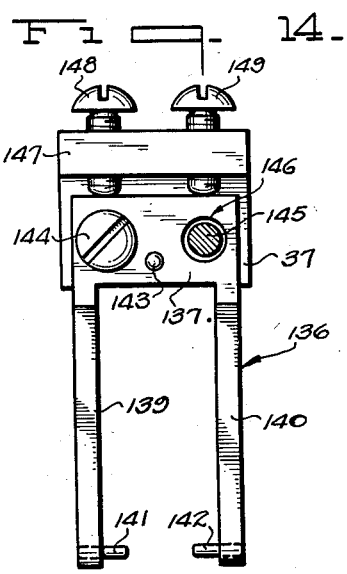
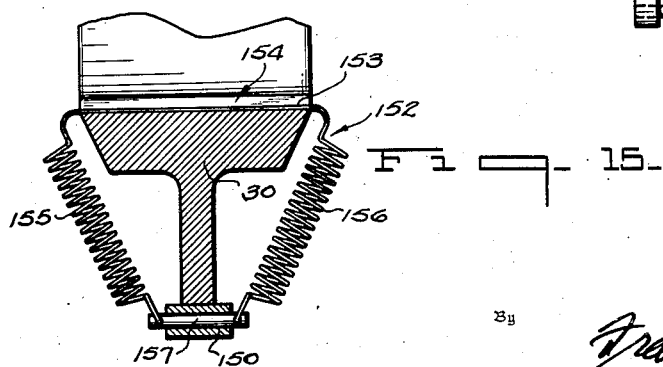
Inventor
EDWIN A. ROSIN.
By Frank Fraser
Attorney Patented June 2, 1936

2,042,553

UNITED STATES PATENT OFFICE 2,042,553

CUTTING APPARATUS

Edwin A. Rosin, Toledo, Ohio, assignor to Libbey-Owens-Ford Glass Company, Toledo, Ohio, a corporation of Ohio Application June 18, 1934, Serial No. 731,056

20 Claims. (Cl. 33—32)

The present invention relates broadly to the art of cutting glass and more particularly to an improved cutting mechanism for use in the scoring of flat sheets or plates of glass and the like.

It is customary, in the surface scoring of glass sheets or plates, to employ either a rotatable steel wheel or a diamond as the cutting tool. When using a diamond, it is absolutely essential to the proper scoring of the glass sheet that the cutting edge of the diamond be accurately positioned with respect to the glass so that it will effect an even and uniform scoring thereof. The proper setting of the diamond is a very delicate operation, requiring fine and minute adjustments thereof. In fact, the diamonds used are ordinarily of such a small size that it is usually impossible to determine the best cutting edge simply by looking at them. On the contrary, the best cutting edge can be determined only by a series of actual tests with the diamond set in different positions.

An important object of this invention resides in the provision of cutting mechanism of novel and improved construction whereby the diamond can be easily and conveniently adjusted into the position in which it is most efficient for scoring.

Another important object of the invention is the provision of an improved form of cutting mechanism embodying a plurality of individual and independent adjustments for the diamond to the end that the cutting edge thereof can be properly positioned for scoring with precision and nicety.

Another object of the invention is the provision of cutting mechanism of this character including a cutting unit which will automatically adjust itself to glass sheets of different thicknesses without previous manual manipulation and also embodying means for yieldably maintaining the cutting diamond in engagement with the glass sheet to compensate for any inequalities in the surface thereof.

A further object of the invention is the provision of cutting mechanism of the above described character embodying means for guiding the cutting diamond up on the glass sheet at the beginning of the scoring operation to avoid any injury to the diamond and also to prevent chipping of the edge of the sheet.

A still further object of the invention is the provision of cutting mechanism of the character above described comprising various novel and improved features of construction, arrangement, and operation, all of which lend themselves to the scoring of the glass sheets or plates in a positive, accurate and efficient manner.

Other objects and advantages of the invention will become more apparent during the course of the following description when taken in connection with the accompanying drawings.

Figure 2:
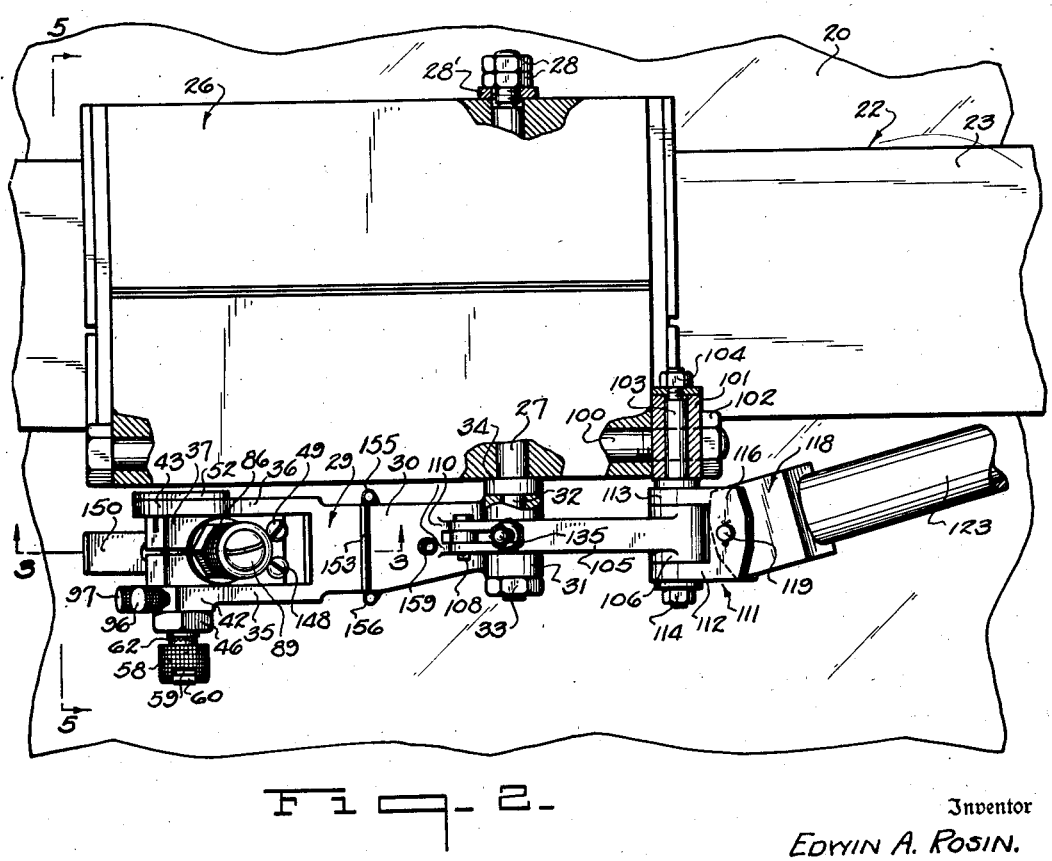

In the drawings wherein like numerals are employed to designate like parts throughout the same, Fig. 1 is a side elevation of cutting mechanism constructed in accordance with the present invention, with a portion of the operating handle being shown in section, Fig. 2 is a plan view thereof partially broken away, Fig. 3 is a longitudinal section through the cutter unit taken substantially on line 3—3 of Fig. 2, Fig. 4 is a detail side elevation of a portion of the cutter unit, Fig. 5 is an end view taken substantially on line 5—5 of Fig. 2, Fig. 6 is a longitudinal sectional view of the outer end of the operating handle, Fig. 7 is an end view thereof, Fig. 8 is a detail plan view showing the means for connecting the operating handle to the cutter unit, Fig. 9 is a perspective view of a portion of the cutter unit, Fig. 10 is also a perspective view of another portion of the cutter unit, Fig. 11 is a bottom view of a portion of the cutter unit, Fig. 12 is a sectional view taken substantially on line 12—12 of Fig. 3, Fig. 13 is a sectional view taken substantially on line 13—13 of Fig. 5, Fig. 14 is a detail view of a part of the cutter guard, and Fig. 15 is a section taken substantially on line 15—15 of Fig. 3.

Referring now to the drawings, the sheet or plate of glass or the like to be cut is designated by the numeral 20 and may be horizontally supported either upon a stationary table 21 (Fig. 3) or, if desired, it may be carried along upon a suitable conveying means. Positioned above the glass sheet 20 is a horizontal cutter guide 22 including a straight edge 23, which is relatively wide and stiff and true in the direction it is desired to maintain accuracy. Carried upon the underside of the straight edge is a relatively narrow bar 24 and to the underside of this bar is secured a plate 25, said plate being relatively wider than the bar 24 but narrower than the straight edge 23. The bar 24 and plate 25 constitute stiffening members in order to reduce the deflection of the cutter guide across the sheet.

Slidably mounted upon the straight edge 23 is a cutter carriage designated in its entirety by the numeral 26. Inasmuch as the specific construction of the carriage and the particular manner of mounting it upon the straight edge constitutes no important part of the present invention per se, it is not believed necessary to enter into a more detailed description thereof. If the glass sheet 20 is supported upon a stationary table, the cutter guide 22 can be supported at its opposite ends in a fixed position, whereas in the event the glass sheet is being carried along upon a suitable conveying means, the cutter guide can be mounted to move therewith.

Passing transversely through the cutter carriage 26, adjacent one end thereof, is a horizontal bolt 27 (Fig. 2), said bolt projecting at its opposite ends beyond the said carriage and having threaded upon one end thereof nuts 28, with a washer 28' being interposed between the nuts and carriage. Pivotally mounted upon the opposite projecting end portion of the bolt 27, forwardly of the cutter carriage, is a cutter unit designated in its entirety by the numeral 29 and including an arcuately curved supporting arm 30 formed at its inner end with a bearing 31 through which the projecting end portion 32 of the bolt 27 loosely extends. Threaded upon the bolt, outwardly of bearing 31, is a nut 33, while interposed between the said bearing and cutter carriage 26 is a washer 34.

The supporting arm 30 of the cutter carriage is bifurcated at its outer end to provide the spaced parallel legs 35 and 36 respectively between which is received a substantially rectangular bearing block 37. This bearing block is provided adjacent its forward end with a transverse bore 38 (Fig. 12) through which is inserted a sleeve 39, said sleeve projecting at its opposite ends beyond the bearing block and extending through openings 40 and 41 formed in the enlarged end portions 42 and 43 of the spaced legs 35 and 36 respectively. One end of the sleeve 39 is formed with an annular flange 44 countersunk within the opening 41, while the opposite end thereof projects through the opening 40 and is screw threaded as at 45 to receive a nut 46 thereon. The bearing block 37 and sleeve 39 are keyed together by means of a key 47 carried by the said sleeve and received within a slot 48 in said bearing block.

Passing loosely through the sleeve 39 is a shaft 49 projecting at its opposite ends therebeyond. One end of the shaft 49 beyond sleeve 39 is reduced in diameter as at 50 (Fig. 12) to form a head 51 at the extreme end of said shaft. The outer enlarged end portion 43 of leg 36 of supporting arm 30 is substantially rectangular and carried thereby are two complemental plates 52 and 53 (Fig. 4) secured in place by screws 54 and 55 respectively. The meeting edges of these two plates are formed intermediate their ends with opposed semi-circular cut-out portions or notches 56 and 57 respectively which define a small circular opening through which the reduced portion 50 of the shaft 49 projects, the said opening being countersunk as shown in Fig. 12 to receive the head 51 therein. With this arrangement, it will be readily apparent that the plates 52 and 53 serve to secure the shaft 49 against longitudinal movement without in any way affecting the free rotation thereof. When it is desired to remove the shaft, however, the plates 52 and 53 can be removed and the said shaft withdrawn longitudinally through the sleeve 39.

Loosely received upon the opposite end of the shaft 49 is an annular cup member 58 having cut in its outer end the aligned notches 59 within which is received the substantially rectangular head 60 formed at the adjacent end of said shaft. Encircling the shaft 49 within cup member 58 is a compression spring 61 which serves to normally urge the latter inwardly. Formed upon the inner end of the cup member is a series of teeth 62 which are adapted to mesh with corresponding teeth formed upon the outer adjacent end of sleeve 39 and the compression spring 61 acts to yieldably maintain the two series of teeth in engagement with one another. With this construction, it will be seen that upon rotation of the cup member 58, the shaft 49 will be rotated therewith due to the engagement of head 60 within notches 59. The teeth 62 on the cup member 58 will ride over the teeth on the sleeve 39 which is held against movement and the interengaging teeth will maintain the shaft 49 against accidental rotation. The opposite end portion of the said shaft is somewhat reduced in diameter as shown in Fig. 12, and has formed thereon a worm 63, the purpose of which will be more fully hereinafter described.

The bearing block 37 is also formed with a substantially vertical opening 64 extending entirely therethrough (Fig. 3) and within which is rotatably mounted a sleeve 65 having formed at its lower end an annular flange 66 engaging the bottom of the bearing block. The upper end of the sleeve 65 is screw threaded as at 67 and has threaded thereupon a nut 68 which serves to hold the said sleeve in place. Formed upon the sleeve 65 intermediate its upper and lower ends and entirely around the periphery thereof is a series of worm teeth 68 which are adapted to mesh with the worm 63 carried by shaft 49, To permit the proper meshing of the worm 63 and worm teeth 68, the sleeve 39 is cut away as at 69 (Figs. 3 and 12).

Arranged within the sleeve 65 and projecting at its lower end therebeyond is a relatively long bushing 70 mounted for non-rotatable but slidable movement; being held against rotation by a key 71 passing transversely through sleeve 65 and received within a longitudinally extending slot 72 in the said bushing. The lower projecting end portion of the bushing 70 is split longitudinally as designated at 73 in Fig. 9, and adapted to be received within this split end is a ferrule 74. This ferrule is provided in its outer end with an opening 75 within which is inserted the cutter holder 76 having embedded in its outer end the diamond 77.

The bushing 70 is externally threaded adjacent its lower end as at 78 and its extreme outer end is bevelled as at 79. Adapted to be threaded upon the bushing 70 is a nut 80 having a bevelled inner surface 81 which, upon threading of the nut upon the bushing, is caused to engage the bevelled end 79 of the said bushing and thereby compress the said bushing in a manner to clamp the ferrule 74 firmly therein. Upon loosening of the nut 80, the ferrule can be adjusted inwardly or outwardly with respect to the bushing 70, as desired.

The bushing 70 is internally threaded at its upper end as at 82 and has received therein the split screw 83 (Figs. 3 and 10) having formed intermediate its ends an annular flange 84 which is clamped between the nut 68 and the outer end of sleeve 65. Also formed upon the screw 83, outwardly of flange 84, is a substantially square portion 85 and received thereupon is a cup member 86, said cup member having a substantially square opening 87 therein within which the square portion 85 on screw 83 is received. Threaded upon the outer end 88 of the screw 83 is a nut 89 provided with an enlarged annular head 90. Encircling the nut within the cup member 86 is a compression spring 91 which serves to yieldably urge the said cup member 86 inwardly. Formed upon the inner end of the said cup member is a series of teeth 92 adapted to mesh with corresponding teeth 93 formed upon the outer end of nut 68, the said compression spring 91 acting to yieldably maintain the teeth 92 and 93 in engagement with one another. Due to the above construction, it will be readily apparent that upon rotation of the cup member 86, the screw 83 will be likewise rotated due to the engagement of the said cup member with the substantially square portion 85. As the screw 83 is held against longitudinal movement, the rotation thereof will cause the bushing 70 and in consequence the cutting diamond to be moved inwardly or outwardly with respect to the sleeve 65. Upon rotation of the cup member, the teeth 92 formed thereon will ride over the teeth 93 on the nut 68.

Upon rotation of the shaft 49 in the manner described above, the sleeve 65 will be caused to rotate and this rotation of the sleeve will effect a corresponding rotation of the bushing 70 and cutter holder 76. As pointed out hereinabove, the accurate setting of the diamond is a very delicate operation and in order to effect proper scoring of the glass, the cutting edge of the diamond must not only be in a plane perpendicular with respect to the glass sheet but also in alignment with the line of cut. By turning the cup member 58, the shaft 49 can be rotated a very small degree in order that a very fine adjustment of the cutting diamond may be effected.

When the diamond or the cutting edge thereon is new, it is possible to bring a relatively long portion of the cutting edge into engagement with the glass sheet. However, as the cutting edge becomes worn, the diamond must be raised to move the point of the cutting edge into engagement with the glass. This adjustment is achieved by rocking the bearing block 37 upon shaft 49 so that the angle of inclination of the cutter holder and diamond may be varied as desired. Since the bearing block 37 and sleeve 39 are keyed together, they of course turn as a unit. In order to effect the proper adjustment of the bearing block about the shaft 49, the sleeve 39 is provided within the enlarged end portion 42 of leg 35 of supporting arm 30, with the two notches or cut-out portions 94 and 95 (Fig. 13) arranged at opposite sides of the shaft 49. Threaded through the outer end of the leg 35 are the adjusting screws 96 and 97, the inner ends 98 and 99 thereof being received within the cut-out portions 94 and 95 and adapted to engage the sleeve 39 at substantially diametrically opposite points. Thus, when it is desired to turn the sleeve upon the shaft 49 to raise or lower the bearing block 37 and in consequence the cutting diamond 77, it is simply necessary to effect the proper adjustment of the screws 96 and 97. For instance, in order to raise the cutting diamond so that it will assume a more vertical position, the set screw 96 is loosened and the set screw 97 tightened to swing the sleeve in a counterclockwise direction, whereas when it is desired to decrease the inclination of the cutting diamond, the set screw 97 is loosened and the set screw 96 tightened to turn the sleeve in a clockwise direction to lower the bearing block 37.

The means for moving the cutter carriage 26 along the straight edge 22 to draw the cutting unit across the glass sheet with the diamond 77 in contact therewith to score the same together with the means for raising and lowering the said cutter relative to the glass will now be described in detail. Extending longitudinally through the carriage 26 is a horizontal bolt 100 projecting beyond the said carriage at one end thereof and carrying a bearing block 101, said block being secured upon the said bolt by a nut 102. Arranged transversely of the carriage and extending through the bearing block 101 is a horizontal bolt 103, one end thereof being threaded to receive a nut 104. The bolt 103 projects beyond the bearing block 101 at the opposite end thereof, and pivotally carried thereby is a substantially horizontal supporting lever 105 having at its inner end a bearing portion 106 through which said bolt is loosely received. The lever 105 is connected to the cutter unit 29 by means of a link 107 pivoted at one end to the said lever by a pin 108 and at its opposite end to the supporting arm 30 of the cutter unit by means of a pin 109, said pin passing through spaced ears 110 formed upon the said supporting arm.

Also loosely mounted upon the bolt 103 is a member designated in its entirety by the numeral 111 and comprising a pair of spaced legs 112 and 113 through which the said bolt extends, said legs being arranged at opposite sides of the bearing portion 106 of lever 105 and secured in place by a nut 114 threaded upon the said bolt. The member 111 is also formed with the spaced substantially horizontal fingers 115 and 116 disposed at substantially right angles with respect to the legs 112 and 113 and adapted to receive therebetween the flange 117 formed upon the block 118 and pivotally secured therebetween by the locking pin 119. The block 118 is formed with an opening 120, the outer flared portion 121 of which is internally threaded.

The numeral 122 designates in its entirety the operating handle which is adapted to be grasped by the operator when it is desired to draw the cutter carriage 26 and cutter across the sheet. The handle 122 comprises an outer tubular member 123, the inner tapered end 124 of which is threaded within the threaded portion 121 of opening 120 in block 118. The operating handle is relatively long and arranged within the outer end portion thereof is a fixed bushing 125 (Fig. 6) closed at its inner end except for a relatively narrow slot 126. Rotatably received within the bushing 125 is a sleeve 127 internally threaded as at 128. Extending longitudinally through the sleeve is a rod 129 substantially rectangular in cross section and adapted to operate through the slot 126 in the inner end of bushing 125, the outer end of said rod being provided with a screw threaded head 130 having threaded engagement with the sleeve 127. With this construction, it will be readily apparent that upon rotation of the sleeve 127, there will be imparted to the rod 129 a longitudinal sliding movement due to the fact that the said rod is prevented from rotating within the slot 126.

Connected to the inner end of the rod 129 is one end of a tension spring 131, the opposite end of which has fastened thereto a chain or the like 132 (Fig. 1) extending beyond the tubular member 123 and being connected to the depending portion 133 formed integral with the lever 105. The tension of the spring 131 can be adjusted as desired simply by rotating the sleeve 127 to move the rod 129 inwardly or outwardly.

In operation, when the operating handle 122 is lifted upwardly by the operator, the cutter unit 29 is lowered into cutting position, whereas when the operating handle is forced downwardly, the cutter unit is adapted to be lifted out of cutting position as indicated by the broken lines in Fig. 1. In order to effect the raising of the cutter unit upon lowering of the operating handle, the depending portion 133 of lever 105 carries a substantially horizontal screw 134 which is adapted to be engaged by the end of the block 118 upon lowering of the operating handle as shown in Fig. 8. Consequently, when the handle is lowered and the block 118 engages screw 134, the lever 105 will be rocked in a clockwise direction to swing the cutter unit upwardly upon the bolt 32. On the other hand, when the operating handle is lifted upwardly and the block 118 moved out of engagement with screw 134, the cutter unit will be permitted to drop by gravity into cutting position. For the purpose of limiting the downward movement of the cutter unit, there is carried by the lever 105 a substantially vertical screw 135 positioned to engage the bearing portion 31 of the supporting arm 30.

The cutter unit 29 is adapted to be normally held in raised or inoperative position by the weight of the operating handle 122 which acts as a counterweight. In other words, when the operating handle is released by the operator subsequent to the cutting operation, the weight of the said handle is such that it will automatically act to raise the cutting diamond out of engagement with the glass and maintain it in such position until it is again lowered by the raising of the operating handle by the operator.

Due to the provision of the tension spring 131, the cutting diamond will be yieldably held in engagement with the glass sheet so that it is capable of a limited amount of vertical movement to take care of any irregularities or waves in the glass. In other words, when the operating handle is lifted upwardly and the block 118 moved out of engagement with screw 134, the spring 131 will be slightly extended to increase the tension thereof and this tension, acting to rock the lever 105 in a counterclockwise direction, will serve through the link 107 to yieldably urge the cutter unit downwardly to maintain the cutting diamond in engagement with the glass. However, as stated above, the cutting diamond will be permitted to move freely vertically so as to take care of any irregularities in the sheet.

This invention also contemplates the provision of means for causing the cutting tool to gradually ride up on the glass sheet 20 at the beginning of the cutting operation and thereby prevent the same from striking against and chipping or otherwise marring the edge of the said sheet or being in turn injured thereby. To this end, there is carried by the bearing block 37 of the cutter unit an inverted, substantially U-shaped guard member 136 comprising, as best illustrated in Figs. 3 and 14, a plate 137 having formed integral therewith the spaced parallel depending legs 139 and 140 carrying at their lower ends the inwardly directed pins 141 and 142 respectively. The guard member 136 is pivotally secured to the bearing block 37 by means of a pin 143 passing through the said plate at a point intermediate the opposite side edges thereof. The guard member is rigidly secured in place by a pair of screws 144 and 145 which pass through the plate 137 and are received within the bearing block. Upon reference particularly to Fig. 14, it will be noted that the screws 144 and 145 do not fit snugly within the openings 146 in the plate 137 but that, on the contrary, there is provided what might be termed a sloppy fit. As a result of such construction, the guard member 136 can be adjusted about the axis of the pin 143 upon loosening the screws 144 and 145. To effect this adjustment and likewise to assist in securing the guard member in properly adjusted position, the bearing block 37 is formed with a flange 147 through which are threaded the screws 148 and 149 engaging the upper edge of the plate 137 at opposite sides of the pivot pin 143.

Arranged between and pivotally carried upon the pins 141 and 142 of the guard member is a substantially horizontal guard shoe 150, said shoe being formed with an opening 151 through which the cutting tool projects. The inner end of the guard shoe is secured to the supporting arm 30 of the cutter unit by means of a tension spring 152, said spring comprising a substantially straight portion 153 received within a notch 154 in the supporting arm 30 and terminating at opposite ends in the two coils 155 and 156 fastened at their free ends to a pin 157 passing transversely through the adjacent end of the guard shoe. With the above construction, it will be seen that upon rocking of the bearing block 37 upon the shaft 49, the guard shoe 150 will also be moved therewith. The guard member 136 is pivotally mounted upon the pin 143 in order that it may be adjusted in a manner that the bottom surface of the guard shoe can be maintained parallel at all times with the upper surface of the glass sheet. This is essential since in the event the bottom surface of the guard shoe is not maintained horizontal, it will not rest evenly upon the glass sheet but will effect a greater pressure thereupon at one side of the cutting diamond than at the other, with the result that it will be very apt to mar the glass.

In order to facilitate the scoring of the glass by the diamond 77, provision is made for applying a line of oil upon the sheet in advance thereof. To this end, the supporting arm 30 of the cutter unit is formed with an enlarged portion 158 within which is arranged a tube 159 secured in place by a set screw 160. Arranged within the tube 159 is a wick 161, said wick being adapted to ride along upon the glass directly in advance of the cutting diamond to apply a thin film of oil thereto.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass cutting apparatus of the character described, a pivotally mounted supporting arm, a bearing block pivotally carried thereby and adapted to swing about a substantially horizontal axis, a cutter holder carried by said bearing block, a diamond carried by the cutter holder, and means carried by said supporting arm for swinging the bearing block about said substantially horizontal axis to regulate the angle of the cutting edge of said diamond with respect to the sheet to be cut and for maintaining the said bearing block in adjusted position.

2. In sheet glass cutting apparatus of the character described, a pivotally mounted supporting arm bifurcated at one end to provide spaced substantially parallel legs, a bearing block arranged between said legs and pivotally carried thereby to swing about a substantially horizontal axis, a cutter holder carried by said bearing block, a diamond carried by said cutter holder, and means carried by one of said legs for swinging the bearing block about said substantially horizontal axis to regulate the angle of the cutting edge of said diamond with respect to the sheet to be cut and for maintaining the said bearing block in adjusted position.

3. In sheet glass cutting apparatus of the character described, a pivotally mounted supporting arm bifurcated at one end to provide spaced substantially parallel legs, a substantially horizontal sleeve extending between and rotatably carried by said legs, a bearing block arranged between the said legs and carried by said sleeve to turn therewith, a cutter holder carried by said bearing block, a diamond carried by said cutter holder, and a pair of adjusting elements carried by one of said legs and engaging the sleeve at substantially diametrically opposite points for turning the said sleeve and bearing block to regulate the angle of the cutting edge of the diamond with respect to the sheet to be cut and for maintaining the same in adjusted position.

4. In sheet glass cutting apparatus of the character described, a pivotally mounted supporting arm, a bearing block carried thereby, a cutter holder rotatably carried by said bearing block, a diamond carried by said cutter holder, and means carried by said supporting arm for rotating the cutter holder to bring the cutting edge of said diamond into alignment with the line of cut and for maintaining the said cutter holder in adjusted position.

5. In sheet glass cutting apparatus of the character described, a pivotally mounted supporting arm, a bearing block carried thereby and having an opening therethrough, a sleeve rotatably mounted within said opening, a cutter holder carried by said sleeve, a diamond carried by said cutter holder, and means carried by said supporting arm for rotating said sleeve and cutter holder to bring the cutting edge of the diamond into alignment with the line of cut.

6. In sheet glass cutting apparatus of the character described, a pivotally mounted supporting arm, a bearing block carried thereby and having an opening therethrough, a sleeve rotatably mounted within said opening and provided with a series of teeth around the periphery thereof, a cutter holder carried by said sleeve, a diamond carried by said cutter holder, a shaft rotatably carried by said supporting arm and provided with a gear meshing with the teeth on the sleeve, and means for rotating said shaft to rotate the said sleeve and cutter holder to bring the cutting edge of the diamond into alignment with the line of cut.

7. In sheet glass cutting apparatus of the character described, a pivotally mounted supporting arm bifurcated at one end to provide spaced substantially parallel legs, a bearing block arranged between said legs and pivotally carried thereby to swing about a substantially horizontal axis, said bearing block having an opening therethrough, a sleeve rotatably mounted within said opening, a cutter holder carried by said sleeve, a diamond carried by said cutter holder, means carried by one of said legs for swinging the bearing block about said substantially horizontal axis to regulate the angle of the cutting edge of said diamond with respect to the sheet to be cut, and means for rotating said sleeve and cutter holder to bring the cutting edge of the diamond into alignment with the line of cut.

8. In sheet glass cutting apparatus of the character described, a pivotally mounted supporting arm bifurcated at one end to provide spaced substantially parallel legs, a sleeve extending between and rotatably carried by said legs, a bearing block arranged between the legs and carried by said sleeve to turn therewith, said bearing block having an opening therethrough, a second sleeve rotatably mounted within said opening, a cutter holder carried by said second-mentioned sleeve, a diamond carried by said cutter holder, means carried by one of the said legs and engaging the first-mentioned sleeve for turning the same and the said bearing block to regulate the angle of the cutting edge of the diamond with respect to the sheet to be cut, and means for rotating said second-mentioned sleeve and cutter holder to bring the cutting edge of the diamond into alignment with the line of cut.

9. In sheet glass cutting apparatus of the character described, a pivotally mounted supporting arm bifurcated at one end to provide spaced substantially parallel legs, a sleeve extending between and rotatably carried by said legs, a bearing block arranged between the legs and carried by said sleeve to turn therewith, said bearing block having an opening therethrough, a second sleeve rotatably mounted within said opening and provided with a series of teeth around the periphery thereof, a cutter holder carried by said second-mentioned sleeve, a diamond carried by said cutter holder, a shaft rotatably mounted within the first-mentioned sleeve and provided with a gear meshing with the teeth on said second-named sleeve, means for rotating said shaft to rotate the last-named sleeve and cutter holder to bring the cutting edge of the diamond into alignment with the line of cut, and means carried by one of said legs and engaging the first-mentioned sleeve for turning the same and the said bearing block to regulate the angle of the cutting edge of the diamond with respect to the sheet to be cut.

10. In sheet glass cutting apparatus of the character described, a pivotally mounted supporting arm bifurcated at one end to provide spaced substantially parallel legs, a sleeve extending between and rotatably carried by said legs, said sleeve projecting beyond one of said legs and provided with a series of teeth at the outer end thereof, a bearing block arranged between the legs and carried by said sleeve to turn therewith, said bearing block having an opening therethrough, a second sleeve rotatably mounted within said opening and provided with a series of teeth around the periphery thereof, a cutter holder carried by said second-mentioned sleeve, a diamond carried by said cutter holder, a shaft rotatably mounted within the first-named sleeve and projecting at one end therebeyond, a cup member loosely received upon the projecting end portion of said shaft and having a series of teeth adapted to engage the teeth on said first-named sleeve, a compression spring encircling the shaft and normally urging the teeth on said cup member into engagement with the teeth on said sleeve, said shaft having a portion engaging the cup member so that upon rotation of the latter the shaft will be caused to rotate therewith to effect rotation of the second-mentioned sleeve and cutter holder to bring the cutting edge of the diamond into alignment with the line of cut, and means carried by one of said legs and engaging the first-mentioned sleeve for turning the same and the said bearing block to regulate the angle of the cutting edge of the diamond with respect to the sheet to be cut.

11. In sheet glass cutting apparatus of the character described, a pivotally mounted supporting arm, a bearing block carried thereby and having an opening therethrough, a sleeve rotatably mounted within said opening, a bushing received within said sleeve for slidable but non-rotatable movement with respect thereto, a cutter holder carried at one end of said bushing, a diamond carried by said cutter holder, and means for effecting longitudinal sliding movement of the said bushing relatively to said sleeve to move the diamond inwardly or outwardly.

12. In sheet glass cutting apparatus of the character described, a pivotally mounted supporting arm, a bearing block carried thereby and having an opening therethrough, a sleeve rotatably mounted within said opening, a bushing received within said sleeve for slidable but non-rotatable movement with respect thereto, a cutter holder carried at one end of said bushing, a diamond carried by said cutter holder, said bushing being internally threaded at the opposite end thereof, and a rotatable screw threaded within said bushing and adapted upon rotation thereof to effect longitudinal sliding movement of the said bushing relative to said sleeve to move the diamond inwardly or outwardly.

13. In sheet glass cutting apparatus of the character described, a pivotally mounted supporting arm, a bearing block carried thereby and having an opening therethrough, a sleeve rotatably mounted within said opening, a bushing received within said sleeve for slidable but non-rotatable movement with respect thereto, a cutter holder carried at one end of said bushing, a diamond carried by said cutter holder, said bushing being internally threaded at the opposite end thereof, a rotatable screw threaded within said bushing and adapted upon rotation thereof to effect longitudinal sliding movement of the said bushing relative to said sleeve to move the diamond inwardly or outwardly, said screw having an annular flange intermediate its ends, a nut threaded upon one end of said sleeve and clamping the flange between the said nut and sleeve, said nut having a series of teeth formed upon the outer end thereof, said screw being also provided with a substantially square portion, a cup member received upon said screw and having a substantially square opening for receiving the square portion of the said screw therein, said cup member being also provided with a series of teeth at the inner end thereof adapted to engage the teeth on said nut, and means for yieldably maintaining the teeth on said cup member in engagement with the teeth on said nut.

14. In sheet glass cutting apparatus of the character described, a pivotally mounted supporting arm, a bearing block pivotally carried thereby and adapted to swing about a substantially horizontal axis, a cutter holder carried by said bearing block, a diamond carried by said cutter holder, means for swinging the bearing block about said substantially horizontal axis to regulate the angle of the cutting edge of said diamond with respect to the sheet, a guard member carried by and movable with the bearing block, a substantially horizontal guard shoe pivoted intermediate its ends to said guard member and having an opening through which said diamond projects, and means for connecting the inner end of said shoe to said supporting arm for movement relative thereto upon swinging movement of the bearing block.

15. In sheet glass cutting apparatus of the character described, a pivotally mounted supporting arm, a bearing block pivotally carried thereby and adapted to swing about a substantially horizontal axis, a cutter holder carried by said bearing block, a diamond carried by said cutter holder, means for swinging the bearing block about said substantially horizontal axis to regulate the angle of the cutting edge of said diamond with respect to the sheet, a guard member carried by and movable with the bearing block, said guard member having a pair of legs disposed at opposite sides of the cutter holder, a substantially horizontal guard shoe disposed between said legs and pivoted intermediate its ends thereto, said guard shoe having an opening through which the diamond projects, means for connecting the inner end of said shoe to said supporting arm for movement relative thereto upon swinging movement of the bearing block, and means for pivotally mounting the guard member upon said bearing block to effect adjustment of the guard shoe so that the bottom surface thereof is in parallel relation with respect to the surface of the sheet to be cut.

16. In sheet glass cutting apparatus of the character described, a horizontal cutter guide, a cutter carriage slidably mounted upon said cutter guide, a cutter unit carried by said carriage and including a pivotally mounted supporting arm, a cutter holder carried by said arm, a cutting tool carried by said holder, and means for moving the cutter carriage along said cutter guide and for also raising and lowering the cutting tool relative to the sheet to be cut comprising a lever pivotally mounted upon said cutter carriage and connected at one end to said supporting arm, and an operating handle also pivotally carried by said carriage and adapted upon lowering thereof to swing the said lever about its pivot to effect the raising of the cutter unit.

17. In sheet glass cutting apparatus of the character described, a horizontal cutter guide, a cutter carriage slidably mounted upon said cutter guide, a cutter unit carried by said carriage and including a pivotally mounted supporting arm, a cutter holder carried by said arm, a cutting tool carried by said holder, and means for moving the cutter carriage along said cutter guide and for also raising and lowering the cutting tool relative to the sheet to be cut comprising a lever pivotally mounted upon said cutter carriage and connected at one end to said supporting arm, an operating handle also pivotally carried by said carriage and adapted upon lowering thereof to swing the said lever about its pivot to effect the raising of the cutter unit, and flexible connections between the operating handle and lever to cause the cutting tool to be yieldably held against the glass during the cutting operation.

18. In sheet glass cutting apparatus of the character described, a horizontal cutter guide, a cutter carriage slidably mounted upon said cutter guide, a cutter unit carried by said carriage and including a pivotally mounted supporting arm, a cutter holder carried by said arm, a cutting tool carried by said holder, and means for moving the cutter carriage along said cutter guide and for also raising and lowering the cutting tool relative to the sheet to be cut comprising a lever pivotally mounted upon said cutter carriage, means for pivotally connecting one end of said lever to the supporting arm, an operating handle also pivotally carried by said carriage and adapted upon lowering thereof to swing the said lever about its pivot to effect the raising of the cutter unit, a spring fastened at one end to said handle and connected at its opposite end to said lever to yieldably maintain the cutting tool in engagement with the glass during the cutting operation, and means for regulating the tension of said spring.

19. In sheet glass cutting apparatus of the character described, a pivotally mounted supporting arm, a substantially horizontal supporting element rotatably carried by said arm, a bearing block carried by said element to turn therewith, a cutter holder carried by said bearing block, a diamond carried by said cutter holder, and means carried by said supporting arm and engaging said supporting element for turning the said element and bearing block to regulate the angle of the cutting edge of the diamond with respect to the sheet to be cut and for maintaining the same in adjusted position.

20. In sheet glass cutting apparatus of the character described, a pivotally mounted supporting arm, a substantially horizontal supporting element rotatably carried by said arm, a bearing block carried by said element to turn therewith, a cutter holder rotatably carried by said bearing block, a diamond carried by said cutter holder, means carried by said supporting arm and engaging said supporting element for turning the said element and bearing block to regulate the angle of the cutting edge of the diamond with respect to the sheet to be cut and for maintaining the same in adjusted position, and means also carried by said supporting arm for rotating the cutter holder to bring the cutting edge of the diamond into alignment with the line of cut and for maintaining the said cutter holder in adjusted position.

EDWIN A. ROSIN.